United States Patent
Woodman et al.

(10) Patent No.: US 9,612,507 B2
(45) Date of Patent: *Apr. 4, 2017

(54) CAMERA MOUNTABLE ARM

(71) Applicant: GoPro, Inc., San Mateo, CA (US)

(72) Inventors: Nicholas D. Woodman, Woodside, CA (US); Rudy Lucas Samuels, Mill Valley, CA (US); Joshua Todd Druker, Redwood City, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/155,336

(22) Filed: May 16, 2016

(65) Prior Publication Data

US 2016/0259230 A1  Sep. 8, 2016

Related U.S. Application Data

(63) Continuation of application No. 14/926,321, filed on Oct. 29, 2015, now Pat. No. 9,369,614, which is a (Continued)

(51) Int. Cl.
*G03B 17/00* (2006.01)
*G03B 17/56* (2006.01)
(Continued)

(52) U.S. Cl.
CPC .............. *G03B 17/561* (2013.01); *A45F 5/10* (2013.01); *F16M 11/00* (2013.01); *F16M 11/10* (2013.01);
(Continued)

(58) Field of Classification Search
USPC ................. 396/419, 420, 422, 428
See application file for complete search history.

(56) References Cited

U.S. PATENT DOCUMENTS 3,508,482 A   4/1970   Taylor
4,091,402 A   5/1978   Siegel
(Continued)

FOREIGN PATENT DOCUMENTS

CN   202132670 U   2/2012

OTHER PUBLICATIONS

International Search Report and Written Opinion for International Application No. PCT/US2014/058465, Dec. 23, 2014, 17 pages.
(Continued)

*Primary Examiner* — Minh Phan
(74) *Attorney, Agent, or Firm* — Fenwick & West LLP (57) ABSTRACT

A camera mountable arm includes a first segment, a second segment, and a third segment. The first segment includes a recess extending substantially along a length of the first segment, and is configured to detachably couple to a camera. The first segment is rotatably coupled to the second segment and the second segment is rotatably coupled to the third segment. The arm is operable in a plurality of positions, including: a folded position, where the first, second, and third segments are aligned to be mutually length-wise parallel such that the second segment is enclosed within the recess along the first segment, and the first and second segments are substantially flush with the third segment; and an outstretched position, where the first and second segments are separated by a first angular displacement and the second and third segments by a second angular displacement.

21 Claims, 10 Drawing Sheets

Related U.S. Application Data continuation of application No. 14/656,734, filed on Mar. 13, 2015, now Pat. No. 9,204,021, which is a continuation of application No. 14/054,640, filed on Oct. 15, 2013, now Pat. No. 9,004,783.

(51) Int. Cl.

| | | |
|---|---|---|
| *F16M 11/00* | (2006.01) | |
| *H04N 5/225* | (2006.01) | |
| *F16M 11/10* | (2006.01) | |
| *F16M 11/16* | (2006.01) | |
| *F16M 11/20* | (2006.01) | |
| *F16M 11/24* | (2006.01) | |
| *F16M 11/38* | (2006.01) | |
| *F16M 13/00* | (2006.01) | |
| *F16M 13/04* | (2006.01) | |
| *A45F 5/10* | (2006.01) | |

(52) U.S. Cl.
CPC ......... *F16M 11/16* (2013.01); *F16M 11/2021* (2013.01); *F16M 11/242* (2013.01); *F16M 11/38* (2013.01); *F16M 13/00* (2013.01); *F16M 13/04* (2013.01); *G03B 17/563* (2013.01); *H04N 5/2251* (2013.01); *A45F 2005/1006* (2013.01); *A45F 2005/1086* (2013.01); *A45F 2200/0533* (2013.01); *F16M 2200/08* (2013.01)

(56) References Cited

U.S. PATENT DOCUMENTS

| | | | |
|---|---|---|---|
| 4,208,028 A | | 6/1980 | Brown et al. |
| 4,733,259 A | | 3/1988 | Ng |
| 5,400,234 A | * | 3/1995 | Yu .......................... F16M 11/20 |
| | | | 362/396 |
| D515,613 S | | 2/2006 | Holmes et al. |
| D577,729 S | | 9/2008 | Derry et al. |
| D577,731 S | | 9/2008 | Altonji et al. |
| 7,494,291 B2 | * | 2/2009 | Saxton ................. G03B 17/563 |
| | | | 248/187.1 |
| 8,014,656 B2 | | 9/2011 | Woodman |
| 9,004,783 B1 | | 4/2015 | Woodman et al. |
| 9,204,021 B2 | | 12/2015 | Woodman et al. |
| 2004/0223752 A1 | * | 11/2004 | Ghanouni ............. G03B 17/00 |
| | | | 396/419 |
| 2006/0257137 A1 | | 11/2006 | Fromm |
| 2008/0117328 A1 | | 5/2008 | Daoud et al. |
| 2008/0248703 A1 | | 10/2008 | Russell |
| 2010/0061711 A1 | * | 3/2010 | Woodman ............. B63B 25/002 |
| | | | 396/428 |
| 2011/0042530 A1 | | 2/2011 | Phillips et al. |
| 2011/0129210 A1 | | 6/2011 | McGucken |
| 2013/0186310 A1 | | 7/2013 | Lymberis |
| 2015/0189131 A1 | | 7/2015 | Woodman et al. |

OTHER PUBLICATIONS

Non-Final Office Action for U.S. Appl. No. 14/054,640, Nov. 14, 2014, 17 Pages.
Final Office Action for U.S. Appl. No. 14/054,640, May 28, 2014, 13 Pages.
Non-Final Office Action for U.S. Appl. No. 14/656,734, May 12, 2015, 30 Pages.
Final Office Action for U.S. Appl. No. 14/926,321, Feb. 17, 2016, 12 Pages.
Non-Final Office Action for U.S. Appl. No. 14/926,321, Nov. 18, 2015, 13 Pages.
Office Action for Chinese Patent Application No. CN 201480056707.2, Nov. 15, 2016, 20 pages.

* cited by examiner

CAMERA MOUNTABLE ARM

CROSS REFERENCE TO RELATED APPLICATIONS

This application is a continuation of U.S. application Ser. No. 14/926,321, filed Oct. 29, 2015, now issued as U.S. Pat. No. 9,369,614, which application is a continuation of U.S. application Ser. No. 14/656,734, filed Mar. 13, 2015, now issued as U.S. Pat. No. 9,204,021, which application is a continuation of U.S. application Ser. No. 14/054,640, filed Oct. 15, 2013, now issued as U.S. Pat. No. 9,004,783, all of which are incorporated by reference in their entirety.

BACKGROUND

Technical Field

This disclosure relates to a camera system, and more specifically, to a configurable arm for mounting a camera.

Description Of The Related Art

Digital cameras are increasingly used in outdoors and sports environments. In order to allow for the safe use of cameras in such environments, the cameras can be secured to camera mounts, which in turn can be secured to, for example, sports equipment, vehicles, or a user. Traditional camera mounts (e.g., camera housings) are designed to be attached to a user's body or to objects on the user's person or in physical proximity to the user. In such configurations, the camera is frequently in close physical proximity to the user, thus limiting the user's maneuverability in handling the camera and limiting the camera's field of view. In some instances, when a user wishes to hold the camera while maintaining a minimum separation from the camera, the user may mount the camera on a rigid mounting pole. However, a rigid camera mounting pole provides the user with limited maneuverability when handling the camera, and often result in the pole being visible within captured images.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

Figure (or "FIG.") 1a illustrates a perspective view of a camera system, according to one embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Camera System Configuration

A camera system includes a camera and a camera housing structured to at least partially enclose the camera. The camera comprises a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera housing includes a lens window structured on the front surface of the camera housing and configured to substantially align with the camera lens, and one or more indicator windows structured on the front surface of the camera housing and configured to substantially align with the camera indicators.

Figure 1A:
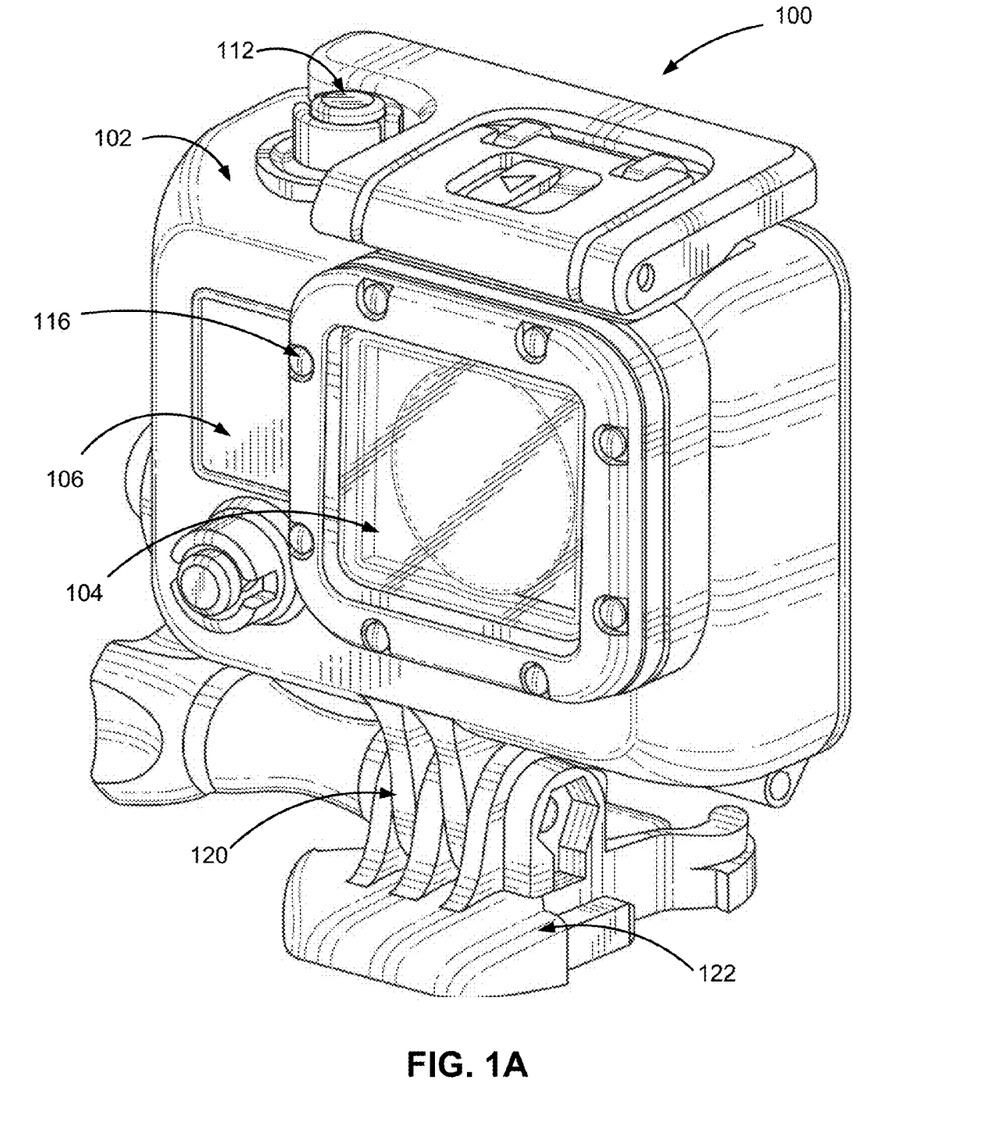
Figure 1B:
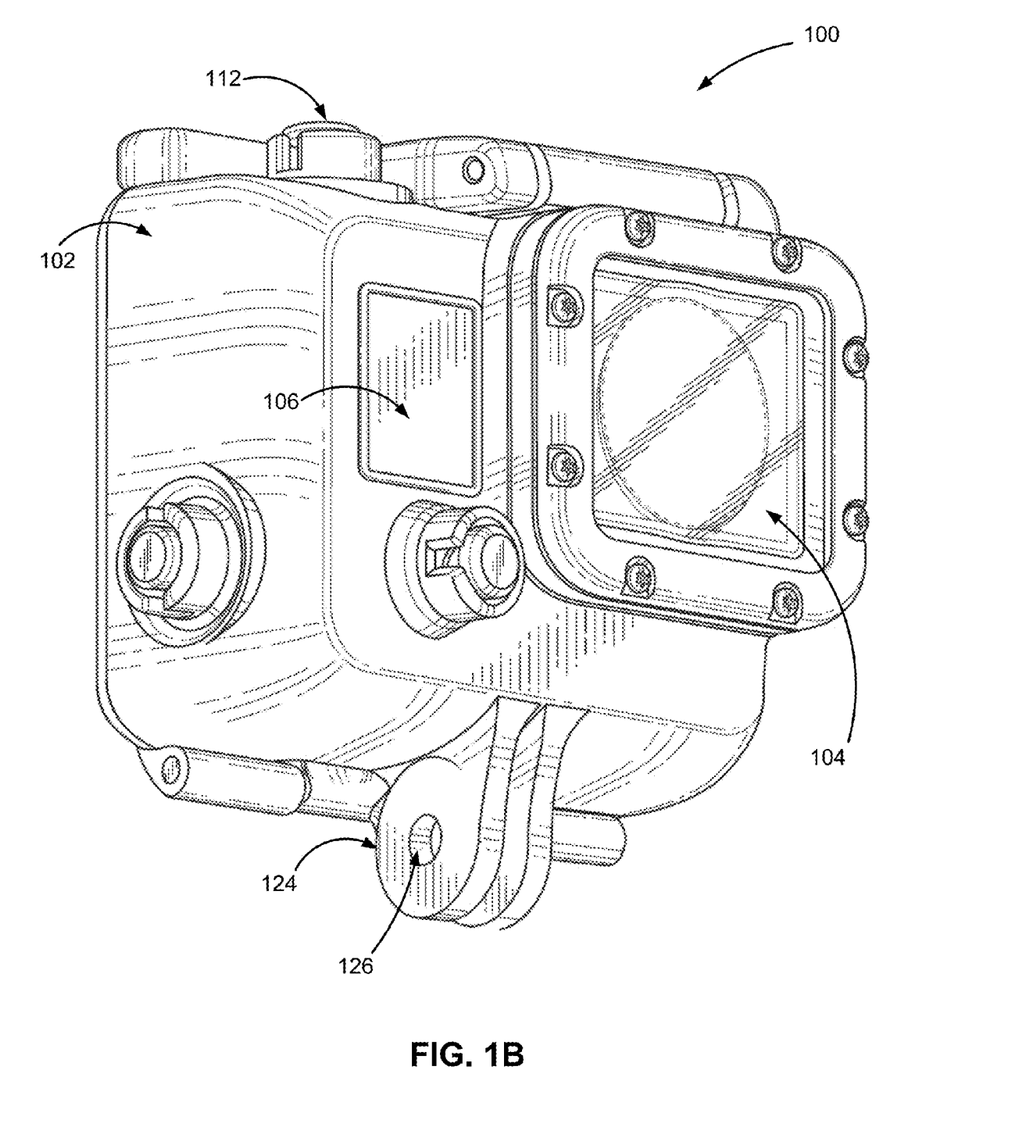
FIG. 1b illustrates another alternative perspective view of a camera system, according to one embodiment.

FIGS. 1a and 1b illustrate various views of a camera system according to one example embodiment. The camera system includes, among other components, a camera housing 100. In one embodiment, a first housing portion 102 includes a front face with four sides (i.e., a top side, bottom side, left side, and right side) structured to form a cavity that receives a camera (e.g. a still camera or video camera). In other embodiments, the camera housing 100 may not include one or more sides or faces. For instance, the camera housing 100 may not include a front or back face, allowing the front face and rear face of the camera to be exposed when partially enclosed by the top side, bottom side, left side, and right side of the camera housing 100.

In one embodiment, the camera housing 100 has a small form factor (e.g., a height of approximately 4 to 6 centimeters, a width of approximately 5 to 7 centimeters, and a depth of approximately 1 to 4 centimeters), and is lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may comprise a waterproof enclosure that protects a camera from water when used, for example, while surfing or scuba diving.

Portions of the camera housing 100 may include exposed areas to allow a user to manipulate buttons on the camera that are associated with the camera functionality. Alternatively, such areas may be covered with a pliable material to allow the user to manipulate the buttons through the camera housing 100. For example, in one embodiment the top face of the camera housing 100 includes an outer shutter button 112 structured so that a shutter button 112 of the camera is substantially aligned with the outer shutter button 112 when the camera is secured within the camera housing 100. The shutter button 112 of the camera is operationally coupled to the outer shutter button 112 so that pressing the outer shutter button 112 allows the user to operate the camera shutter button.

In one embodiment, the front face of the camera housing 100 includes a lens window 104 structured so that a lens of the camera is substantially aligned with the lens windows 104 when the camera is secured within the camera housing 100. The lens window 104 can be adapted for use with a conventional lens, a wide angle lens, a flat lens, or any other specialized camera lens. In this embodiment, the lens window 104 comprises a waterproof seal so as to maintain the waterproof aspect of the housing 100.

In one embodiment, the camera housing 100 includes one or more securing structures 120 for securing the camera housing 100 to one of a variety of mounting devices. For example, FIG. 1a illustrates the camera housing secured to a clip-style mount 122. In this example, the camera housing 100 includes a first plurality of protrusions (protrusions 124 as shown in FIG. 1b), and the mount 122 includes a second plurality of protrusions. Each protrusion includes a hole (hole 126 as shown in FIG. 1b) at a similar location within the protrusion such that the first and second pluralities of protrusions can interlock in such a way that the protrusion holes substantially align. Continuing with this example, a turnable handscrew is inserted through the aligned holes, coupling the camera housing 100 to the mount 122 such that the camera housing can pivotally rotate relative to the mount when the turnable handscrew is in a first unlocked position, and such that the camera housing is fixed in position relative to the mount when the turnable handscrew is in a second locked position. In other embodiments, the camera housing 100 can be secured to a different type of mounting structure, and can be secured to a mounting structure via a different type of coupling mechanism.

In one embodiment, the camera housing 100 includes an indicator window 106 structured so that one or more camera indicators are substantially aligned with the indicator window 106 when the camera is secured within the camera housing 100. The indicator window 106 can be any shape or size, and can be made of the same material as the remainder of the camera housing 100, or can be made of any other material, for instance a transparent or translucent material and/or a non-reflective material.

The described housing 100 may also be adapted for a wider range of devices of varying shapes, sizes and dimensions besides cameras. For example, an expansion module may be attached to housing 100 to add expanded features to electronic devices such as cell phones, music players, personal digital assistants ("PDAs"), global positioning system ("GPS") units, or other portable electronic devices.

Figure 1C:
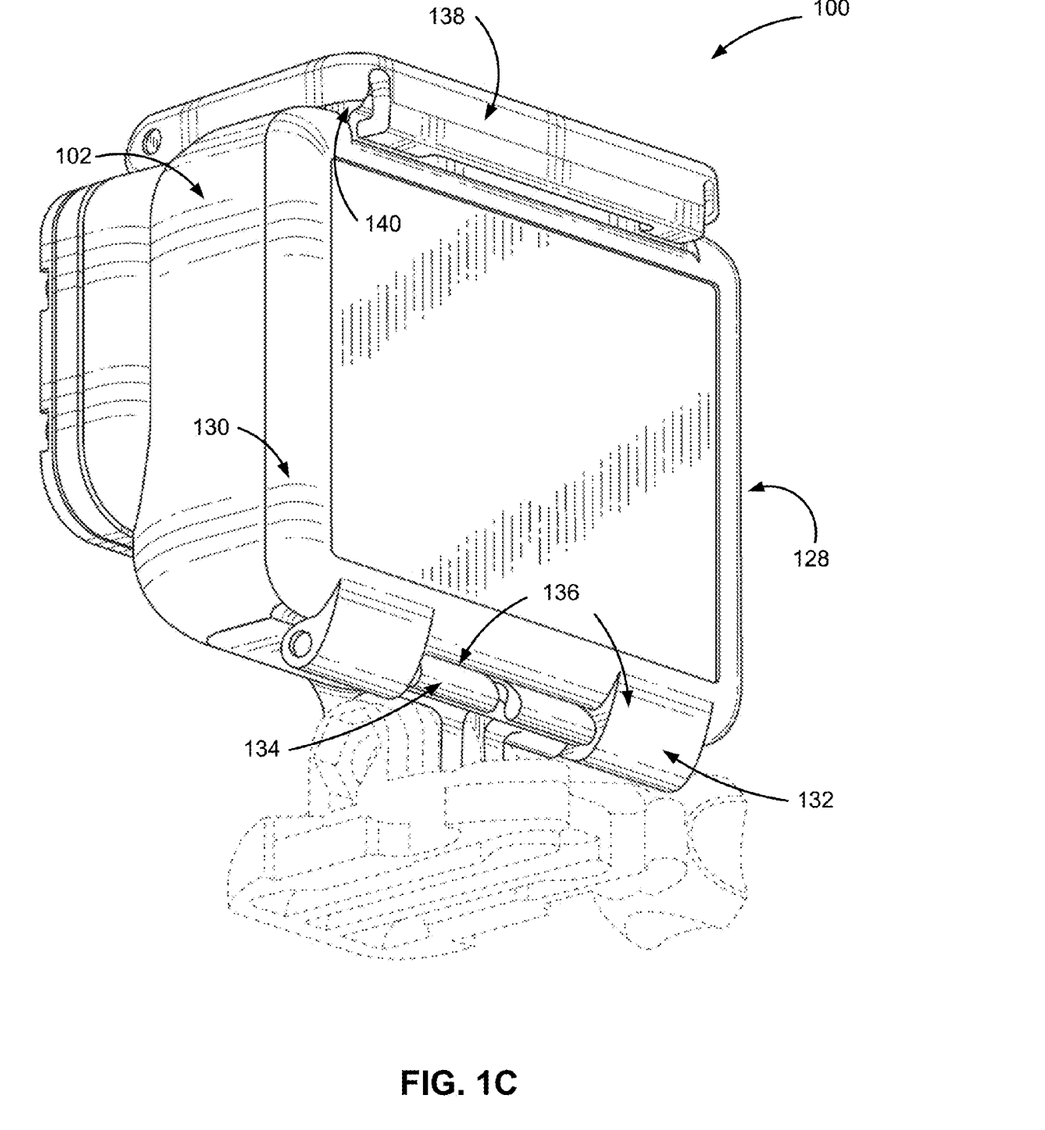
FIG. 1c illustrates a perspective view of a rear of the camera system, according to one embodiment.

FIG. 1c is a rear perspective view of camera housing 100 illustrating a second housing portion 128, according to one example embodiment. The second housing portion 128 detachably couples with the first housing portion 102 opposite the front face of the first housing portion. The first housing portion 102 and second housing portion 128 are collectively structured to enclose a camera within the cavity when the second housing portion 128 is secured to the first housing portion 102 in a closed position.

In one embodiment, the second housing portion 128 comprises a door 130 that allows the camera to be removed from the housing 100. The door 130 pivots around a hinge 136 that allows the door 130 to be opened or shut. In one embodiment, a first fastening structure 138 located on the top face of the camera housing 100 detachably couples to a second fastening structure 140 on the door 130. The fastening structures 138, 140 secure the door 130 to the first portion 102 of the camera housing 100 in a closed position when coupled, as illustrated in FIG. 2. In one embodiment, the fastening structure 138 comprises a hook-shaped lateral bar and the fastening structure 140 comprises an L-shaped bar. The fastening structure 138 can pivot upwards to allow the door 130 to close and can then be pressed down around the fastening structure 140 to hold the door 130 in the closed position. In different embodiments, fastening structures for securing the door 130 can include, for example, a button assembly, a buckle assembly, a clip assembly, a hook and loop assembly, a magnet assembly, a ball and catch assembly, and an adhesive assembly, or any other type of securing mechanism.

In one alternative embodiment, the hinge 136 is instead located on the top face of the housing 100 and the fastening structures 138, 140 are instead located on the bottom face of the housing 100. Alternatively, the hinge 136 and fastening structures 138, 140 may be located on opposite side faces of the camera housing 100.

In one embodiment, the housing 100 includes a watertight seal so that the housing 100 is waterproof when the door 130 is shut. For example, in one embodiment, the door 130 includes a sealing structure positioned on interior edges of the door 130. The sealing structure provides a watertight seal between the first portion of the camera housing 102 and the door 130 when the first securing structure 138 on the top face of the camera housing 100 is coupled to the second securing structure 140 on the top edge of the door 130.

In one embodiment, an outer hinge structure 132 on the bottom edge of the second housing portion 128 detachably couples to an inner hinge structure 134 on the bottom edge of the first housing portion 102 to form the hinge 136. For example, in one embodiment, the outer hinge structure 132 comprises one or more hook-shaped protrusions structured to securely fasten to a rod-shaped member of the inner hinge structure 134. Other mechanisms for coupling the second housing portion 128 to the housing 100 may also be used in various alternative embodiments. In other embodiments, the second housing portion 128 may be permanently attached to the first housing portion 102.

Figure 2A:
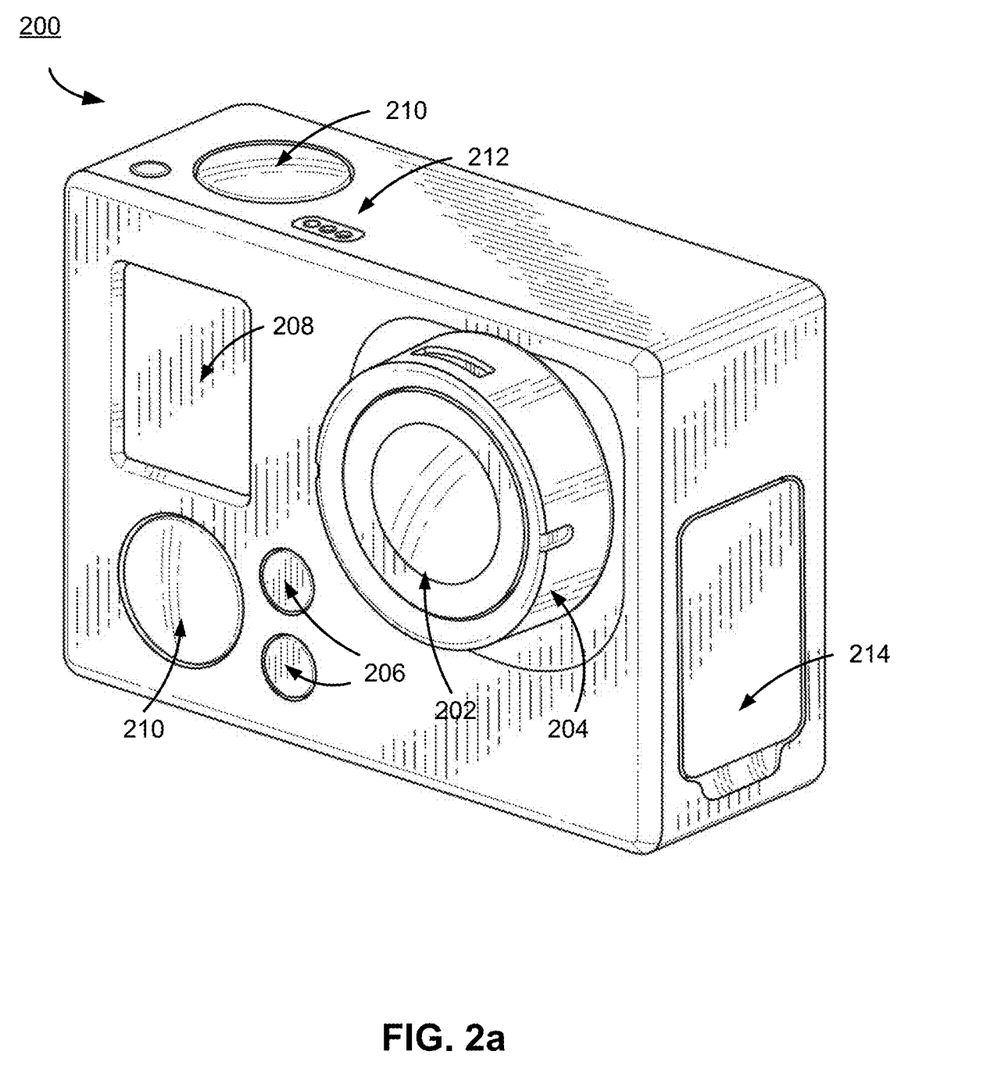
FIG. 2a illustrates a perspective view of a camera for use with the camera system, according to one embodiment.

FIG. 2a illustrates a camera 200 for use with the camera systems described herein, according to one example embodiment. The camera 200 is configured to capture images and video, and to store captured images and video for subsequent display or playback. The camera 200 is adapted to fit within a camera housing, such as the housing 100 discussed above or any other housing described herein. As illustrated, the camera 200 includes a lens 202 configured to receive light incident upon the lens and to direct received light onto an image sensor internal to the lens. The lens 202 is enclosed by a lens ring 204.

The camera 200 can include various indicators, including the LED lights 206 and the LED display 208 shown in FIG. 2a. When the camera 200 is enclosed within the housing 100, the LED display 208 is configured to substantially align with the indicator window 106, and the LED lights 206 are configured to be visible through the housing 100. The camera 200 can also include buttons 210 configured to allow a user of the camera to interact with the camera, to turn the camera on, and to otherwise configure the operating mode of the camera. The camera 200 can also include a microphone 212 configured to receive and record audio signals in conjunction with recording video. The side of the camera 200 includes an I/O interface 214. Though the embodiment of FIG. 2a illustrates the I/O interface 214 enclosed by a protective door, the I/O interface can include any type or number of I/O ports or mechanisms, such as USC ports, HDMI ports, memory card slots, and the like.

Figure 2B:
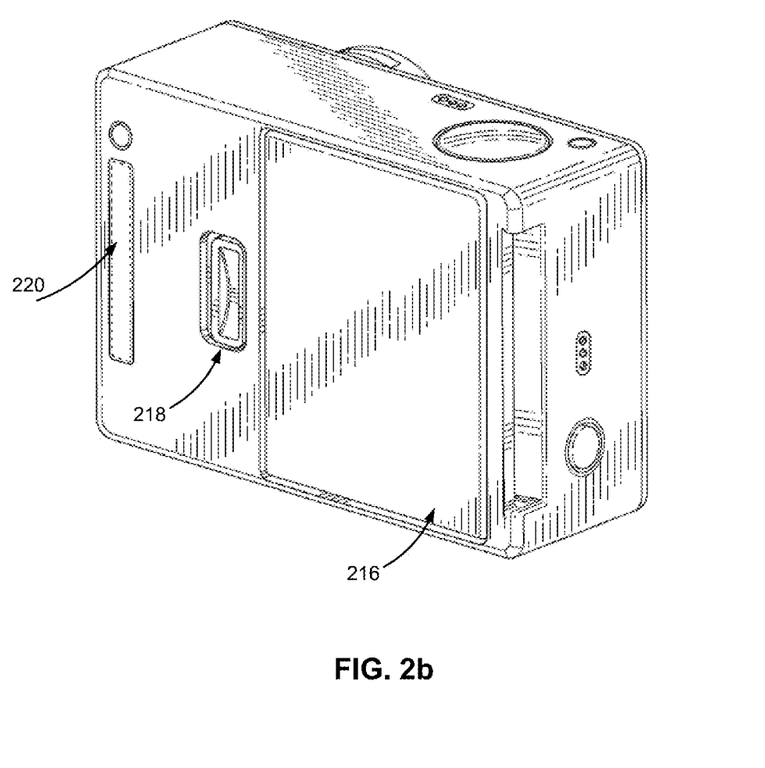
FIG. 2b illustrates a perspective view of a rear of a camera for use with the camera system, according to one embodiment.

FIG. 2b illustrates a perspective view of a rear of a camera 200 for use with the camera system, according to one embodiment. The camera 200 includes a door 216 that covers a removable battery and battery interface. The door 216 can be removed via the door release mechanism 218. The camera also includes an expansion pack interface 220 configured to receive a removable expansion pack, such as a display module, an extra battery module, a wireless module, and the like. Removable expansion packs, when coupled to the camera 200, provide additional functionality to the camera via the expansion pack interface 220.

Camera Mountable Arm

Traditional camera mounts are frequently configured to attach to a user's body or to objects on the user's person (such as a back-pack). Such camera mount configurations typically allow users to operate cameras in a hands-free configuration. However, in such configurations, since the camera is attached to the user's person or to objects on the user's person, the camera is situated in physical proximity to the user. In some instances, when using a camera, users may wish to hold and operate the camera at a distance from themselves.

For example, in a self-capture mode where users wish to take self-images, the users may prefer to keep a minimum separation between the camera and themselves so as to optimize the size of their own image in proportion within the overall captured image or camera field of view. Furthermore, in some embodiments, when capturing videos or still images of objects that are obscured from view, users may wish to have a certain range or degree of flexibility and maneuverability in handling the camera so as to enable them to capture images or videos of such objects from a broad range of possible points of view by varying the positioning of the camera as the camera is held by the user at a distance.

Accordingly, a foldable camera mountable arm can detachably couple to and secure a camera. The camera mountable arm includes a plurality of segments including a first segment, a second segment, and a third segment. The first segment includes a camera mount configured to detachably couple to a camera. In some embodiments, the segments are connected by hinge joints that enable the segments to rotate relative to one another. Consequently, the arm can be configured to operate in a plurality of positions (each offering distinct or complementary functionality), including an outstretched position (as explained further with reference to FIG. 3a below) and a folded position (as explained further with reference to FIG. 3b below).

Figure 3A:
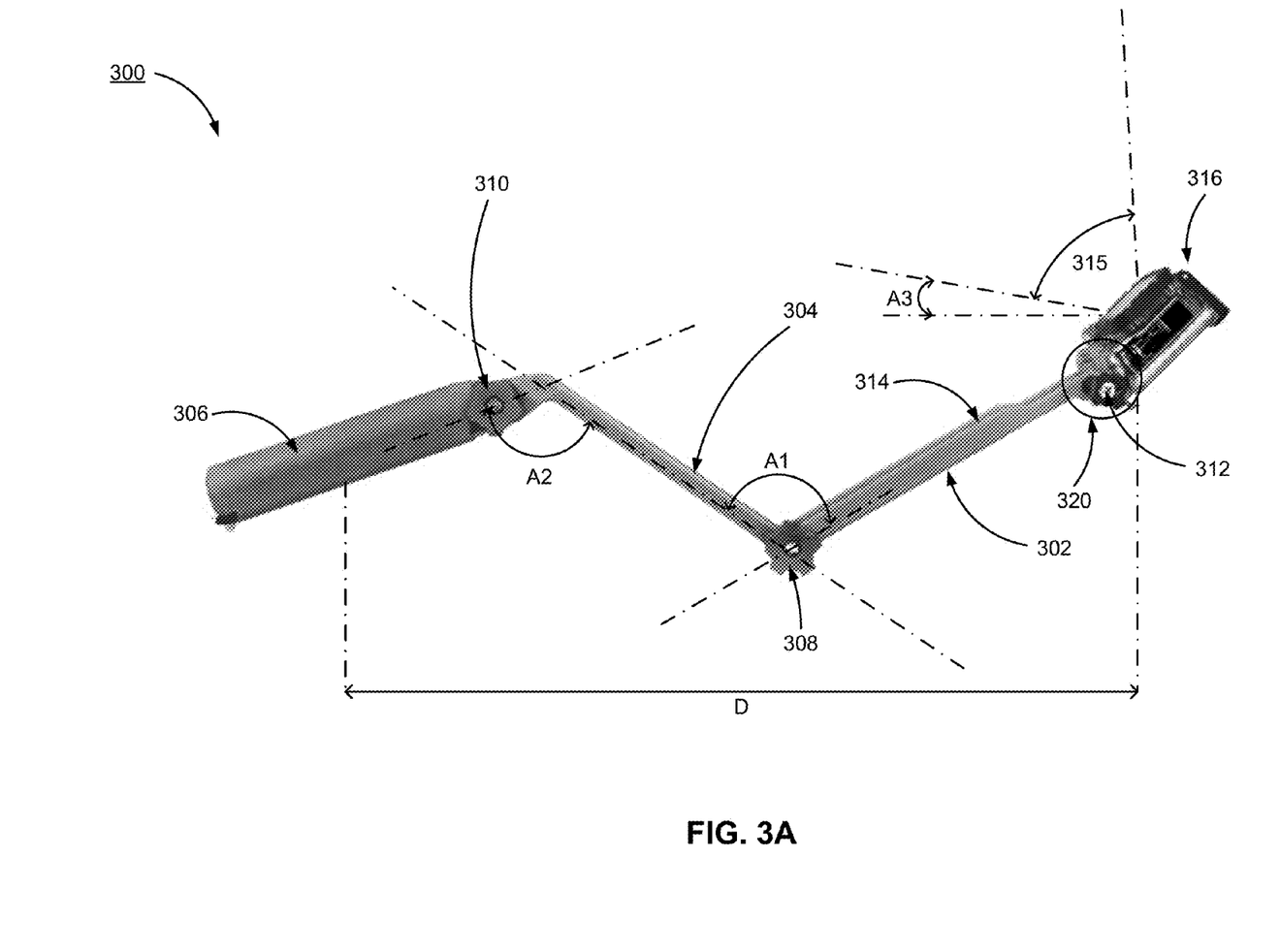
FIG. 3a illustrates a side view of a camera mountable arm in an outstretched position, according to some embodiments.

FIG. 3a illustrates a side view of a camera mountable arm 300 in an outstretched position, according to some embodiments. In the outstretched position, the arm 300 can function as an elongated mounting pole with a camera 316 mounted at a pole end distal from the user, thereby providing an increased range of separation between the user and the camera 316. It should be noted that although a first outstretched position is illustrated in FIG. 3a, other outstretched positions are possible by increasing or decreasing the angular displacement between adjacent segments.

The camera mountable arm 300 shown in FIG. 3a includes a plurality of segments including segment 302, segment 304, and segment 306. Segment 302 has a camera mount 320 configured to detachably and rotatably couple to camera 316. Segment 302 is rotatably coupled to segment 304 by a hinge mechanism 308. Similarly, segment 304 is rotatably coupled to segment 306 by hinge mechanism 310. In the outstretched position, segments 302 and 304 are separated by a first angular displacement A1 and segments 304 and 306 are separated by a second angular displacement A2.

Figure 3B:
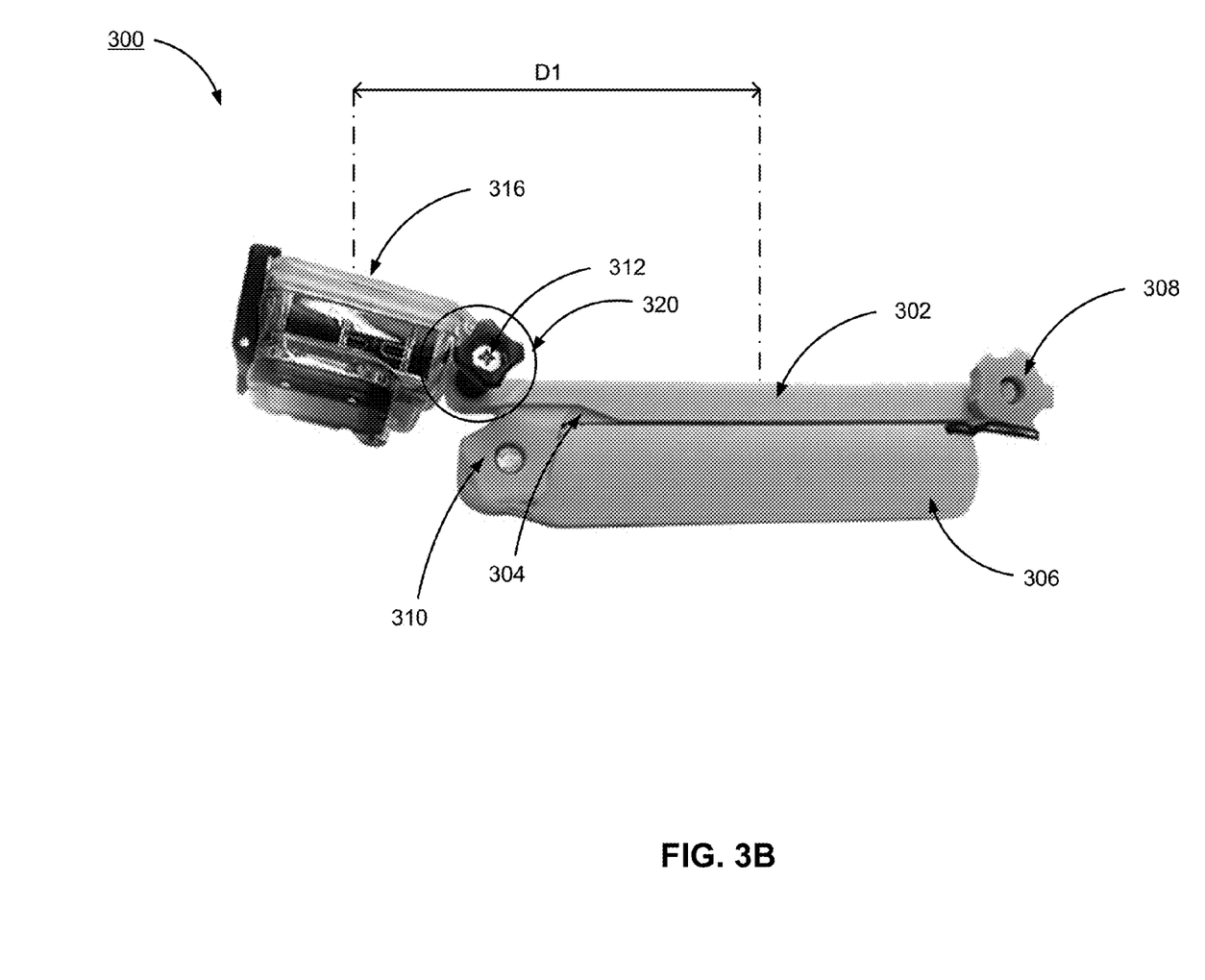
FIG. 3b illustrates a side view of the camera mountable arm in a folded position, according to some embodiments.

In the outstretched position, the arm 300 forms an elongated pole with segment 306 configured to serve as a hand grip. The camera 316, when coupled to segment 302, is situated at a distance D from a center of the hand grip. Thus, the camera 316 has a first degree of visual accessibility. In other words, by extending the camera 316 further away from the user's person than a predefined separation D1 (as illustrated in FIG. 3b), the arm 300 enables the camera 316 to have a point of view for image or video capture based at least in part on the distance D from the user's hand.

Furthermore, in the outstretched position, a respective field of view 315 of the camera 316, measured in the embodiment of FIG. 3a based on the angular displacement A3 from horizontal, varies based on a respective value of the first angular displacement A1, a respective value of the second angular displacement A2, an angular rotation of the camera 316 relative to the segment 302, or a combination of the three. For example, in a first configuration (e.g., in a self-capture mode) of the outstretched position, the arm 300 is partially outstretched such that respective values of the angular displacements A1 and A2 are acute angles (between 0° and 90°) or obtuse angles (between 90° and 180°), and such that the angular displacement A3 is less than 90°, allowing the user to effectively capture self-images while holding the hand grip of segment 306.

On the other hand, in a second configuration of the outstretched position, the arm 300 is completely outstretched with segment 302, segment 304, and segment 306 being substantially collinear, such that respective values of the angular displacements A1 and A2 are substantially 180°. As a result, a separation between the user and the camera is further increased (e.g., relative to the first configuration), enabling the capture of images from a further distance from the user than the embodiment of FIG. 3a.

In some embodiments, at a given distance D of camera 316 from a center of the hand grip, the point of view and the field of view of camera 316 can be further modified by orienting the camera relative to a user, for instance to be in a forward facing orientation or a reverse facing orientation.

In some embodiments, the camera mountable arm 300 includes a rigid supporting or bracing latch coupled between segment 304 and segment 306 configured to prevent an inadvertent folding (or collapse) of segment 304 toward segment 306 at the hinge mechanism 310. By preventing such inadvertent folding of segment 304 toward segment 306, the rigid supporting or bracing latch beneficially protects a user's hand from injury while gripping the camera mountable arm 300.

FIG. 3b illustrates a side view of camera mountable arm 300 in a folded position, according to some embodiments. In the folded position, segments 302, 304, and 306 are folded close and compactly together, thereby reducing the effective length of the arm 300 and reducing the separation between the user and the camera to the distance D1. This folded position provides a convenient form factor that allows for easy transportation of the arm 300.

In some embodiments, segment 302 has a recess 314 extending substantially along a length of segment 302. In the folded position, the segments 302, 304, and 306 are aligned to be mutually length-wise parallel such that segment 304 is folded into the segment 302 by being received and enclosed within the recess 314 along segment 302. Furthermore, in the folded position shown in FIG. 3b, a face of the folded segments 302 and 304 is substantially flush with a face of the segment 306. As a result, in the folded position, the arm 300 forms a handle such that segments 302, 304, and 306 jointly form a hand grip.

Camera 316, when coupled to segment 302, is situated at a predefined separation D1 from a center of the hand grip. In other words, by positioning camera 316 closer to the user's person, the arm 300 enables the camera 316 to have a second point and field of view, distinct from the first point and field of view illustrated in FIG. 3a.

Figure 4:
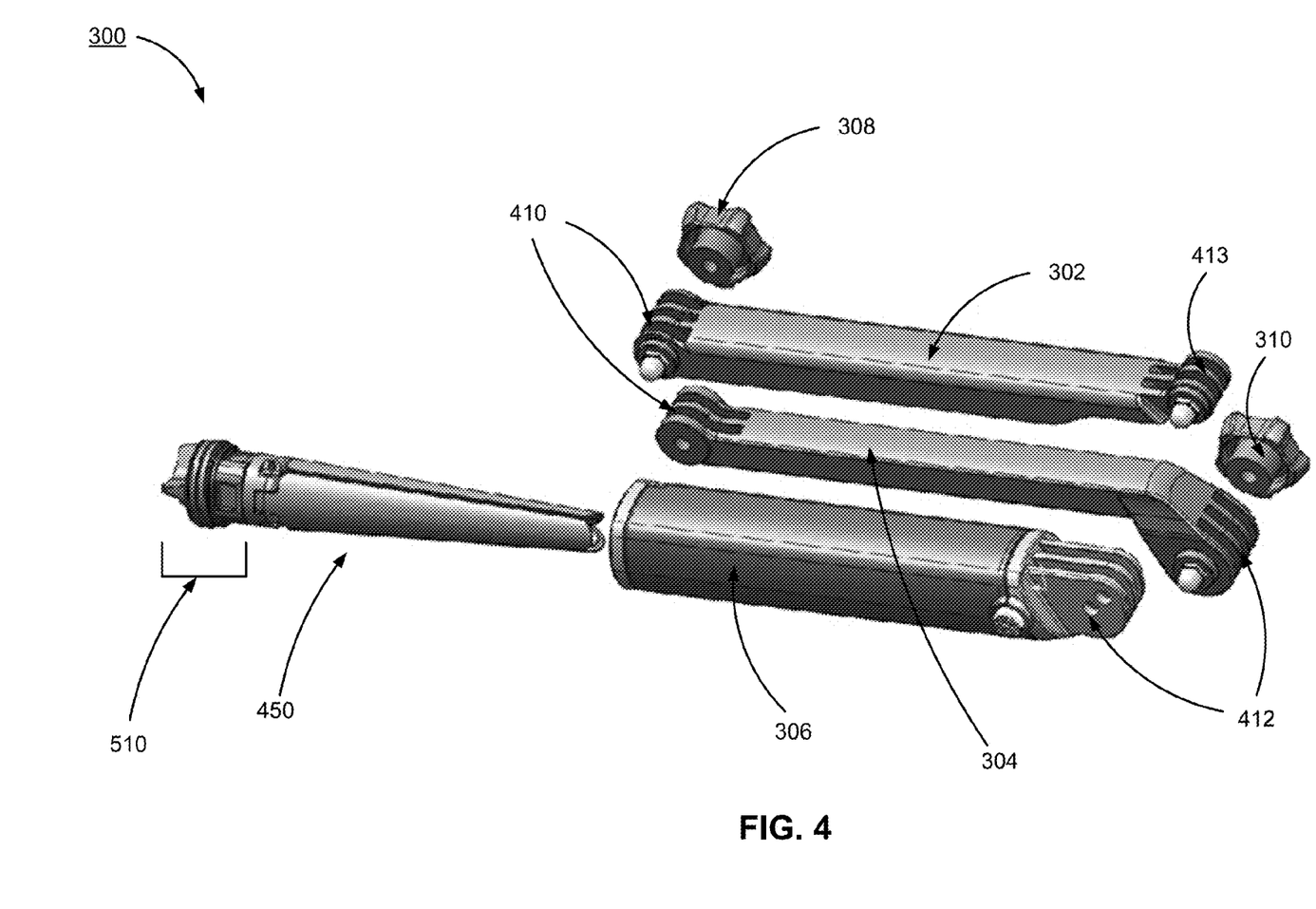
FIG. 4 illustrates a view of the components of the camera mountable arm in a disassembled configuration, according to some embodiments.

FIG. 4 illustrates a view of the components of the camera mountable arm 300 in a disassembled configuration, according to some embodiments. When assembled into a camera mountable arm, segment 302 is rotatably coupled to segment 304 by a plurality of interlocking protrusions 410 (e.g., a first set of fingers on segment 302 and a second mating or complementary set of fingers on segment 304). When assembled, the plurality of interlocking protrusions 410 are interlocked and coupled by a removable turnscrew 308. Similarly, when the mountable arm is assembled, segment 304 is rotatably coupled to segment 306 by a plurality of interlocking protrusions 412 that are coupled by a removable turnscrew 310. The camera mount 320 shown in FIG. 3a includes a plurality of interlocking protrusions 413 on segment 302 coupled to the camera 316 or a camera housing by a removable screw 312 (shown in FIG. 3a). It should be noted that in some embodiments, the camera mount 320 can directly couple to the segment 306, allowing the segment 306 to operate as a handle for use with the camera without the segments 302 and 304.

Furthermore, the segment 306 optionally includes a substantially hollow interior (e.g., a hollow cavity) configured to slidably receive and enclose a tripod appendage 450. In some embodiments, the hollow interior of segment 306, when filled with air, can be configured to be air-tight, providing buoyancy to the camera mountable arm 300 when used in water. In some embodiments, the hollow interior within segment 306, when filled with water, provides immersability to the camera mountable arm 300 within water. Such an ability to submerge the mountable arm 300 within a fluid is beneficial for use in under water applications such as image capture during diving or snorkeling. Segments 302, 304, and 306 of the mountable arm 300 and tripod appendage 450 are optionally made of a water-resistant material (e.g., plastic, polymer, and the like) to allow the mountable arm 300 to be used in or under water without damage from contact with water.

Figure 5A:
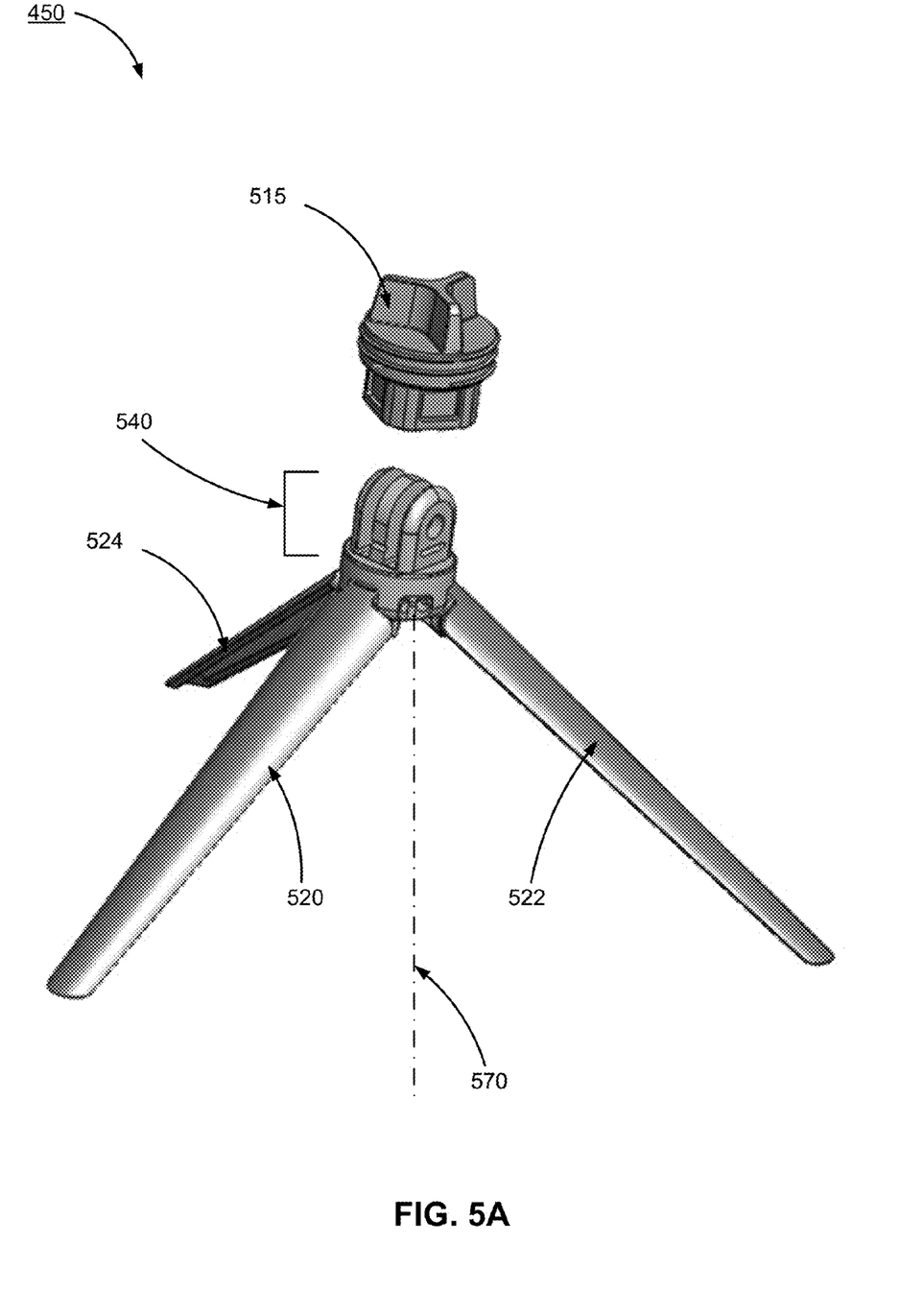
FIGS. 5a-5b illustrate perspective views of a tripod appendage when deployed for use as a camera tripod, according to some embodiments.
Figure 5B:
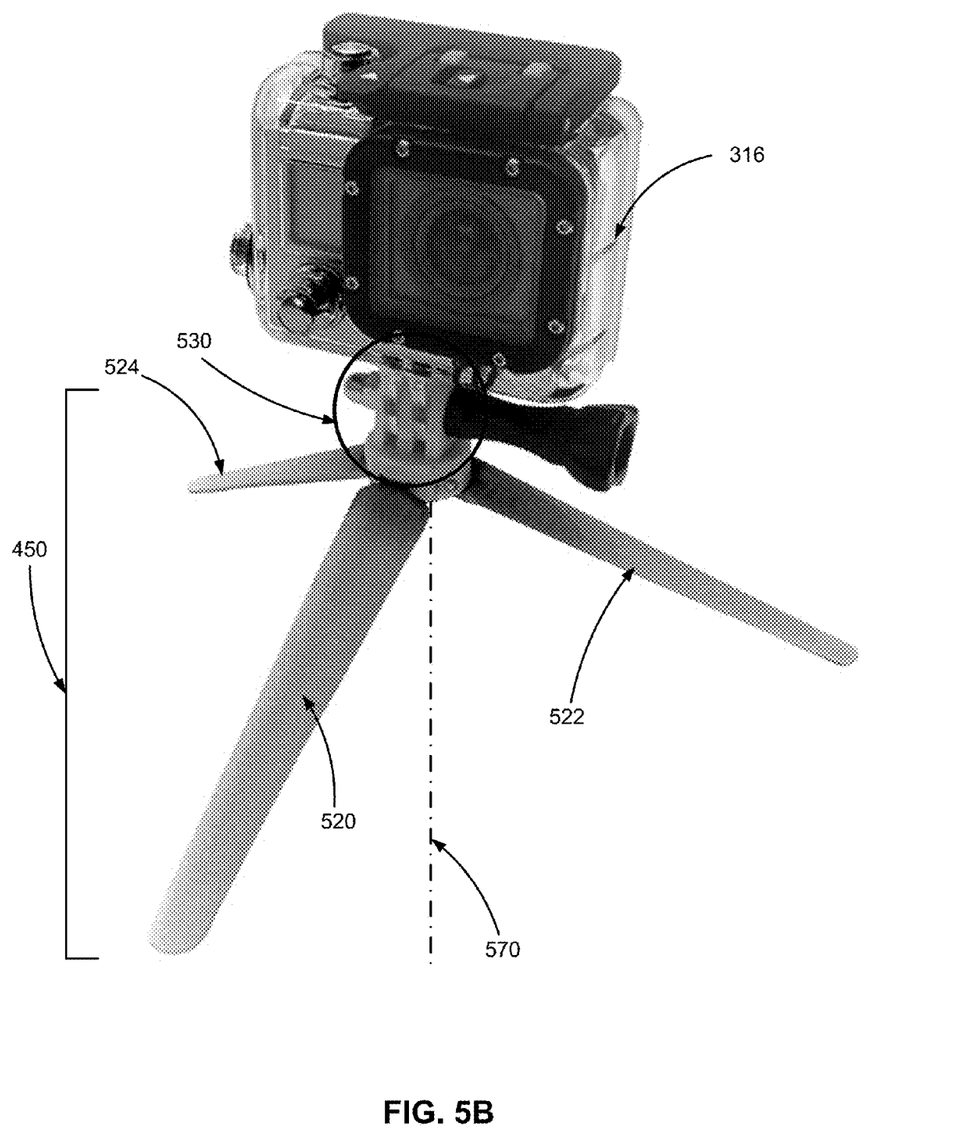

FIGS. 5a-5b illustrate perspective views of a tripod appendage 450 when deployed for use as a camera tripod, according to some embodiments. The tripod appendage 450 includes a head 510 (shown in FIG. 4) and a plurality of legs (520, 522, and 524). The legs (520, 522, and 524) of the tripod appendage 450 are pivotally (e.g., foldably) coupled to the head 510 so that the tripod appendage can be operated in a plurality of modes, including a collapsed mode and a deployed mode, by folding the legs inward or outward.

In the collapsed mode, the plurality of legs (520, 522, and 524) is folded inward toward a central axis 570 of the tripod appendage 450 and the tripod appendage 450 is configured to be slidably enclosed within the substantially hollow interior of segment 306 (as explained with reference to FIG. 4).

On the other hand, in a deployed mode, one or more of the plurality of legs (520, 522, and 524) are folded outward away from the central axis 570 of the tripod appendage 450 so to form a supporting tripod base on which camera 316 can be mounted (as illustrated in FIG. 5b). Toward this end, the head 510 (shown in FIG. 5a) of the tripod appendage 450 includes a removable cap 510 (also shown in FIG. 5a), which covers or conceals a camera mount 540. In the deployed position, upon removal of the cap 510, the camera mount 540 couples to camera 316 by a plurality of interlocking protrusions 530 (as illustrated in FIG. 5b). Although not illustrated, in some embodiments the tripod appendage 450 can be coupled to the base of the segment 306 such that when the tripod is in the deployed mode, the mounting arm 300 can be extended and placed upon a surface. Such a configuration allows the camera 316 to be used without requiring a user to hold the mounting arm 300, allowing the user to take advantage of the benefits of the extended mounting arm while the arm is out of reach from the user.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A camera mountable arm comprising:
a first segment configured to pivotally couple to a camera mount;
a second segment configured to pivotally couple to the first segment; and
a handle segment configured to pivotally couple to the second segment when the camera mountable arm is in a first configuration and to directly pivotally couple to the camera mount when the camera mountable arm is in a second configuration;
wherein the camera mountable arm, when configured in the first configuration, is operable in a folded position and an extended position, a portion of a first face of the first segment configured to substantially abut a portion of a second face of the handle segment when the camera mountable arm is operable in the folded position such that the first segment is parallel to the handle segment.

2. The camera mountable arm of claim 1, wherein the handle segment comprises a substantially hollow interior.

3. The camera mountable arm of claim 2, wherein the handle further comprises an opening within an end of the handle segment into the substantially hollow interior and a removable cap such that, when the removable cap is coupled over the opening, the handle segment and the removable cap form a watertight seal around the hollow interior.

4. The camera mountable arm of claim 2, wherein the substantially hollow interior is configured to encompass additional camera equipment.

5. The camera mountable arm of claim 4, wherein the additional camera equipment comprises a tripod appendage.

6. The camera mountable arm of claim 5, wherein the tripod appendage comprises a head and a plurality of legs pivotally coupled to the head, the tripod appendage configured to operate in a plurality of modes, including:
a collapsed mode, in which each of the plurality of legs is folded inward toward a central axis of the tripod appendage and the tripod appendage is configured to be slidably enclosed within the substantially hollow interior of the handle; and
a deployed mode, in which one or more of the plurality of legs are folded outward away from the central axis of the tripod appendage to form a supporting tripod base.

7. The camera mountable arm of claim 1, wherein the camera mount comprises a first coupling mechanism, and wherein the first segment and the handle segment each comprise a reciprocal coupling mechanism configured to couple to the first coupling mechanism.

8. The camera mountable arm of claim 7, wherein the first coupling mechanism and a reciprocal coupling mechanism, when coupled, comprise a hinge mechanism configured to allow the camera mount to pivotally rotate relative to the reciprocal coupling mechanism.

9. The camera mountable arm of claim 7, wherein the first coupling mechanism comprises a first set of protrusions, the reciprocal coupling mechanism comprises a second set of protrusions, and wherein each protrusion of the first set of protrusions and the second set of protrusions comprises a hole such that when each hole of the first set of protrusions and the second set of protrusions are aligned, a turnable handscrew can be inserted into the holes, coupling the first coupling mechanism to the reciprocal coupling mechanism.

10. The camera mountable arm of claim 1, wherein the handle segment comprises a grip.

11. The camera mountable arm of claim 1, wherein a first surface of the first segment and a second surface of the second segment form a flush surface when the camera mountable arm is operable in the folded position.

12. A camera mountable arm comprising:
a first segment configured to pivotally couple to a camera mount;
a second segment configured to pivotally couple to the first segment; and
a handle segment configured to pivotally couple to the second segment when the camera mountable arm is in a first configuration and to directly pivotally couple to the camera mount when the camera mountable arm is in a second configuration;
wherein the camera mountable arm, when configured in the first configuration, is operable in a folded position and an extended position, a portion of a first face of the first segment and a portion of a second face of the second segment forming a substantially flush surface when the camera mountable arm is operable in the folded position.

13. The camera mountable arm of claim 12, wherein the handle segment comprises a substantially hollow interior.

14. The camera mountable arm of claim 13, wherein the handle further comprises an opening within an end of the handle segment into the substantially hollow interior and a removable cap such that, when the removable cap is coupled over the opening, the handle segment and the removable cap form a watertight seal around the hollow interior.

15. The camera mountable arm of claim 13, wherein the substantially hollow interior is configured to encompass additional camera equipment.

16. The camera mountable arm of claim 15, wherein the additional camera equipment comprises a tripod appendage.

17. The camera mountable arm of claim 16, wherein the tripod appendage comprises a head and a plurality of legs pivotally coupled to the head, the tripod appendage configured to operate in a plurality of modes, including:
a collapsed mode, in which each of the plurality of legs is folded inward toward a central axis of the tripod appendage and the tripod appendage is configured to be slidably enclosed within the substantially hollow interior of the handle; and
a deployed mode, in which one or more of the plurality of legs are folded outward away from the central axis of the tripod appendage to form a supporting tripod base.

18. The camera mountable arm of claim 12, wherein the camera mount comprises a first coupling mechanism, and wherein the first segment and the handle segment each comprise a reciprocal coupling mechanism configured to couple to the first coupling mechanism.

19. The camera mountable arm of claim 18, wherein the first coupling mechanism and a reciprocal coupling mechanism, when coupled, comprise a hinge mechanism configured to allow the camera mount to pivotally rotate relative to the reciprocal coupling mechanism.

20. The camera mountable arm of claim 18, wherein the first coupling mechanism comprises a first set of protrusions, the reciprocal coupling mechanism comprises a second set of protrusions, and wherein each protrusion of the first set of protrusions and the second set of protrusions comprises a hole such that when each hole of the first set of protrusions and the second set of protrusions are aligned, a turnable handscrew can be inserted into the holes, coupling the first coupling mechanism to the reciprocal coupling mechanism.

21. The camera mountable arm of claim 12, wherein the handle segment comprises a grip.

* * * * *